United States Patent
Bulan et al.

(10) Patent No.: US 9,928,424 B2
(45) Date of Patent: Mar. 27, 2018

(54) SIDE WINDOW DETECTION THROUGH USE OF SPATIAL PROBABILITY MAPS

(71) Applicant: Xerox Corporation, Norwalk, CT (US)

(72) Inventors: Orhan Bulan, Webster, NY (US); Beilei Xu, Penfield, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 194 days.

(21) Appl. No.: 15/049,568

(22) Filed: Feb. 22, 2016

(65) Prior Publication Data

US 2017/0243067 A1    Aug. 24, 2017

(51) Int. Cl.
*G06K 9/00* (2006.01)
*G06K 9/46* (2006.01)
*G06K 9/62* (2006.01)

(52) U.S. Cl.
CPC ..... *G06K 9/00771* (2013.01); *G06K 9/00832* (2013.01); *G06K 9/00838* (2013.01); *G06K 9/4609* (2013.01); *G06K 9/627* (2013.01); *G06K 2209/23* (2013.01); *G06T 2207/30248* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 9,111,136 B2 * | 8/2015 | Paul | G06K 9/00369 |
| 9,477,881 B2 * | 10/2016 | Konishi | H04N 7/188 |
| 2003/0013951 A1 | 1/2003 | Stefanescu et al. | |
| 2008/0175438 A1 * | 7/2008 | Alves | G08G 1/0175 382/105 |
| 2013/0141574 A1 | 6/2013 | Dalal et al. | |
| 2013/0147959 A1 | 6/2013 | Wang et al. | |
| 2014/0363051 A1 | 12/2014 | Burry et al. | |
| 2015/0097952 A1 | 4/2015 | Eschbach et al. | |
| 2015/0149086 A1 | 5/2015 | Albert, Jr. et al. | |

(Continued)

OTHER PUBLICATIONS

Artan, Y. et al., "Driver Cell Phone Usage Detection from HOV/HOT NIR Images," IEEE Conference on Computer Vision and Pattern Recognition Workshops (2014) Columbus, OH, Jun. 23-28, pp. 225-230.

(Continued)

*Primary Examiner* — Matthew Bella
*Assistant Examiner* — Jose M Torres
(74) *Attorney, Agent, or Firm* — Kermit D. Lopez; Luis M. Ortiz; Ortiz & Lopez, PLLC

(57) ABSTRACT

Methods, systems, and processor-readable media for detecting the side window of a vehicle. A spatial probability map can be calculated, which includes data indicative of likely side window locations of a vehicle in an image. A side window detector can be run with respect to the image of the vehicle to determine detection scores. The detection scores can be weighted based on the spatial probability map. A detected region of interest can be extracted from the image as extracted image patch. An image classification can then be performed with respect to the extracted patch to provide a classification that indicates whether or not a passenger is in the vehicle or no-passenger is in the vehicle.

20 Claims, 10 Drawing Sheets

(56) References Cited

U.S. PATENT DOCUMENTS

| | | |
|---|---|---|
| 2015/0278617 A1* | 10/2015 | Oami .................. G06T 1/60 |
| | | 382/103 |
| 2015/0279036 A1 | 10/2015 | Artan et al. |
| 2015/0286849 A1 | 10/2015 | Stimming et al. |
| 2015/0294144 A1* | 10/2015 | Konishi ............... H04N 7/188 |
| | | 382/103 |
| 2015/0324653 A1 | 11/2015 | Xu et al. |
| 2015/0363940 A1 | 12/2015 | Held et al. |

OTHER PUBLICATIONS

Crivello, F. et al., "Comparison of Spatial Normalization Procedures and Their Impact on Functional Maps," Human Brain Mapping (2002) 16:228-250.

Zhu, X. et al., "Face Detection, Pose Estimation, and Landmark Localization in the Wild," IEEE Conference on Computer Vision and Pattern Recognition (2012) Providence, RI, Jun. 16-21, pp. 2879-2886.

Song, J. et al., "Digitize Your Body and Action in 3-D at Over 10 FPS: Real Time Dense Voxel Reconstruction and Marker-less Motion Tracking via GPU Acceleration," CoRR, Nov. 2013, 23 pages.

Kowdle, A. et al., "Video Categorization Using Object of Interest Detection," 17th IEEE International Conference on Image Processing (2010) Hong Kong, Sep. 26-29, pp. 4569-4572.

\* cited by examiner

SIDE WINDOW DETECTION THROUGH USE OF SPATIAL PROBABILITY MAPS

TECHNICAL FIELD

Embodiments are generally related to the field of image-processing and video-based detection. Embodiments are also related to video-based vehicle detection for identifying managed lane violations in HOV/HOT (High Occupancy Vehicle/High Occupancy Tolling) lanes. Embodiments are further related the detection of side windows through the use of probability maps.

BACKGROUND

Systems for automated HOV/HOT lane enforcement as well as for other additional enforcement (e.g., cell phone and seat belt violation detection) are being developed. Such systems rely on a camera-based imaging arrangement to capture images/videos in the near-infrared (NIR) band through a windshield or a side window of an oncoming vehicle. A detection algorithm examines the images/videos to determine candidate HOV/HOT violators for law-enforcement officers to take action on. Depending on the rules of the lane (e.g., 2 occupants or 3 occupants required), if the front and rear passenger seats are unoccupied, then the vehicle is classified as a candidate violator.

For a candidate violator, an evidence package consisting of a front seat image, a rear seat image, a license plate image, and a color vehicle image can be generated and sent to a downstream law enforcement officer or to a back office. In one workflow, a law enforcement officer may review the evidence package and determine whether the vehicle should be pulled over and the driver should be ticketed. In another workflow, the officer may be located in the back office at a police station and reviews the evidence package and determines whether the owner is ticketed through the mail. In another application, toll adjustments are made consistent with the number of occupants in the vehicle.

FIG. 1 illustrates a pair of prior art front and side view images 12, 14, respectively captured by a camera based HOV/HOT enforcement system. An algorithm is utilized to first localize the vehicle windshield and passenger side window from the captured front and side view images 12, 14, respectively. The localized regions are then passed into a classifier to identify if the vehicle has a passenger in the front and/or rear seat. Detecting windshield and side windows accurately is important in the system pipeline as the errors made in the localization step are propagated through the rest of the system. While the (front) windshield detection performance is typically higher than 99.9% in various weather, camera, and illumination conditions, achieving a similar performance for side window detection remains a challenge.

FIG. 2 illustrates a group 20 of images 22, 24, 26, 28, and 29 depicting variations in passenger side windows for different vehicle types. A fundamental reason for the performance gap between windshield and side window detectors as described above is due to the large variation of side window shapes for different vehicle types as illustrated in FIG. 2.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image-processing and video-based detection of regions of interest in captured images.

It is another aspect of the disclosed embodiments to provide for a video-based vehicle detection method, system, and processor-readable media for identifying managed lane violations in HOV/HOT (High Occupancy Vehicle/High Occupancy Tolling) lanes.

It is yet another aspect of the disclosed embodiments to provide for the detection of vehicle side windows through the use of probability maps.

The aforementioned aspects and other objectives and advantages can now be achieved as described herein. Methods, systems, and processor-readable media are disclosed for detecting the side window of a vehicle. A spatial probability map can be calculated, which includes data indicative of likely side window locations of a vehicle in an image. A side window detector can be run with respect to the image of the vehicle to determine detection scores. The detection scores can be weighted based on the spatial probability map. A detected region of interest can be extracted from the image as extracted image patch. An image classification can then be performed with respect to the extracted patch to provide a classification that indicates whether or not a passenger is in the rear seat or no-passenger is in the rear seat.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
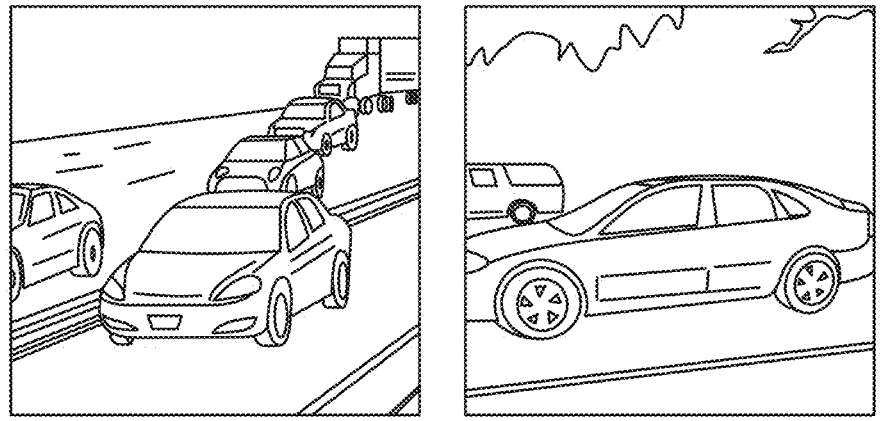
FIG. 1 illustrates a pair of prior art front and side view images captured by a camera based HOV/HOT enforcement system.
Figure 2:
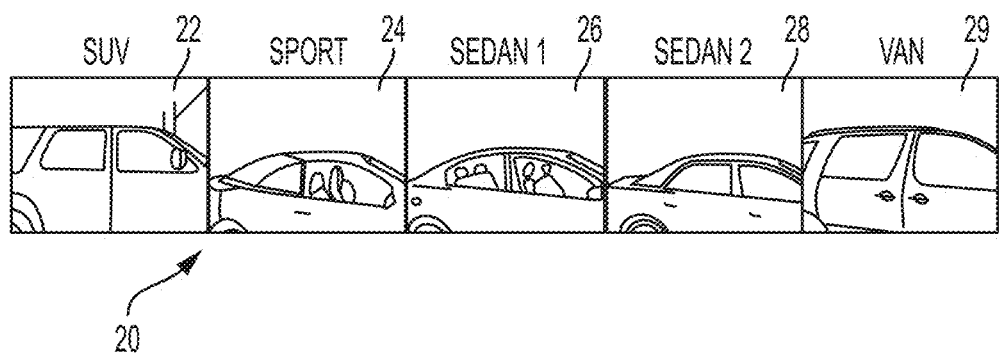
FIG. 2 illustrates a group of images depicting variations in passenger side windows for different vehicle types.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be described in greater detail herein, the disclosed embodiments can implement a two-stage approach for side window detection. In the first stage, a spatial probability map ("heat" map) is calculated for likely side window locations. This heat map is utilized to weight the detection scores of the side window detector in the second step. Several alternative novel embodiments are described herein to calculate the heat map for the likely side window locations given a captured side window image. An example embodiment can include the following modules: 1) a module for capturing a side view vehicle image; 2) a module for calculating a heat map for likely side window locations in the captured image; 3) a module for running a side window detector using, for example, a deformable parts model or region-convolutional neural network (R-CNN) or any sliding window classifier; 4) a module for weighting the detection scores based on the heat map; 5) a module for extracting the detected region from the image; and 6) a module for performing an image classification for the extracted patch, where the classification indicates passenger/no-passenger.

For detecting windshield and side windows, a deformable parts model can be trained. Such a model can utilize a mixture of trees (poses) with a shared pool of parts defined at each landmark positions. The model can then utilize global mixtures to model topological changes due to viewpoints. The global mixture can also be used to capture gross deformation changes for a single viewpoint. Each particular configuration of parts $L=\{I_i: i \in V\}$ can be evaluated for the given image I by a score function as shown in Equation (1) below:

$$S(I,L,m) = App_m(I,L) + Shape_m(L) + \alpha^m \quad (1)$$

In Equation (1), V is a shared pool of parts (i.e., the landmark points), m indicates a mixture, and $V_m \in V$ and $I_i = (x_i, y_i)$ for the pixel location of part i. $App_m$ sums the appearance evidence for placing a template for part i, tuned for mixture m, at location $I_i$ and $Shape_m$ scores the mixture specific spatial arrangement of parts L. Finally, $a^m$ is a scaler bias or "prior" associated with viewpoint mixture m. This model can be considered as a linear classifier, which generates window detection scores for the image regions, and the highest score is typically assigned as the window region. During inference, Equation (1) can be over L and m, as shown by Equation (2) below:

$$S^*(I) = \max_m \left[ \max_L S(I, L, m) \right] \quad (2)$$

Embodiments are disclosed involving a novel two-stage approach for side window detection. In the first stage, operations can be implemented to calculate and compile a spatial probability map described as a "heat map" for likely side window locations and use this heat map to weigh the detection scores of the side window detector in the second step. Several alternative novel embodiments can be utilized to calculate the heat map for the likely side window locations given a captured side window image.

As will be explained in greater detail, embodiments can be implemented, which include the following modules for: capturing a side view vehicle image; calculating a heat map for likely side window locations in the captured image; running a side window detector using, for example, a deformable parts model; weighting the detection scores based on the heat map; extracting the detected region from the image; and performing an image classification for the extracted patch, where the classification indicates passenger/no-passenger.

The heat map can be calculated for likely passenger side window locations. Such a calculation can be performed using one or more of the methods such as, for example, manually labeling the passenger side window on a set of training images; first detecting driver side window and referring the likely passenger side window locations relative to the detected driver side window; and first detecting windshield from a front view image and performing a feature matching between the detected windshield and the side view image of the same vehicle and referring the likely passenger side window locations based on the location of the matched features.

Figure 3:
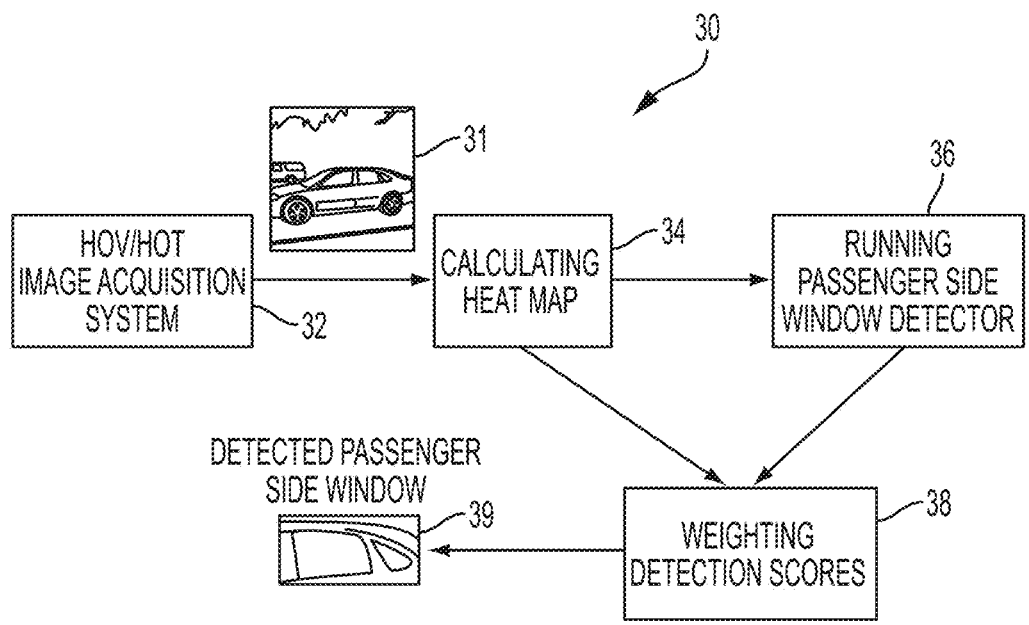
FIG. 3 illustrates a flow chart of operations depicting logical operational steps of a method for improved passenger side window detection, in accordance with an example embodiment.
Figure 4:
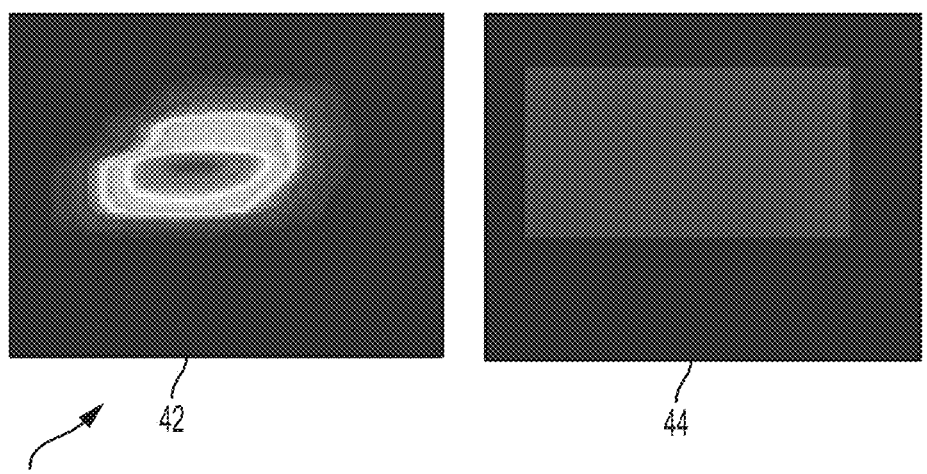
FIG. 4 illustrates a heat map depicting a probability map of a passenger side window for a particular acquisition setup and a corresponding search region defined for side window detection, in accordance with an example embodiment.

FIG. 3 illustrates a flow chart of operations depicting logical operational steps of a method 30 for improved passenger side window detection, in accordance with an example embodiment. As shown at block, 32, an HOV/HOT image acquisition system can capture an image 31 of a vehicle. A heat map can then be calculated as illustrated at block 34 with respect to the image 31. An example of a heat map is shown in FIG. 4. As depicted thereafter at block 36, a step or operation can be implemented to run a passenger side window detector application or module with respect to the image 31 (which is already subject to the heat map at this point in the process). A step or operation can then be implemented as illustrated at block 38 in which detection scores are weighted. The detected passenger side window is then identified, as indicated by image 39.

Images such as image 31 can be captured in, for example, HOV/HOT lanes in highways or expressways utilizing, for example, commercially available RGB cameras, which are directed towards the windshield of an incoming vehicle. In some example embodiments, if night vision is desired, cameras with NIR capabilities coupled with an external illuminator can also be employed. Alternatively, images captured by existing HOV/HOT cameras, other tolling cameras, speed detection cameras, or the like can be processed to implement the approach described herein.

FIG. 4 illustrates a heat map 40 that includes a probability map 42 of a passenger side window for a particular acquisition setup and a corresponding search region 44 defined for side window detection, in accordance with an example embodiment. Calculating the heat map for likely passenger side window locations can be performed using one or more of the following methods: manually labeling the passenger side window on a set of training images; first detecting driver side window and referring the likely passenger side window locations relative to the detected driver side window; and first detecting windshield from a front view image and performing a feature matching between the detected windshield and the side view image of the same vehicle and referring the likely passenger side window locations based on the location of the matched features.

Even though the side window of a vehicle can be detected via a DPM (Deformable Part Model), the detection of the second row side window turns out to be much more challenging than the front windshield detection, especially when the background is cluttered with tree lines or other structures/objects such as vehicles traveling in adjacent lanes or vehicles with multiple rear-rows such as mini-vans. The challenge also arises from the fact that side windows have more inherent intra-class variation in their shapes and sizes relative to the front windshields. Hence, in addition, to apply a threshold on the detection scores to select candidate ROI's (Regions of Interest), we introduced a prior map, a priori probability map (i.e., heat map) which describes the probability that a particular pixel belongs to a window or not to further eliminate false positive detections for the second row windows. The probability map is generated from training data and can be visualized through a heat map 40 as shown in FIG. 4.

One way to calculate this probability map (or heat map) is to manually annotate the location of passenger side windows on a set of training images and aggregate the results. But this method is time consuming and requires human intervention for generating the heat map. Considering this process needs to be repeated for each site the system installed, it can be quite cumbersome and costly.

Figure 5:
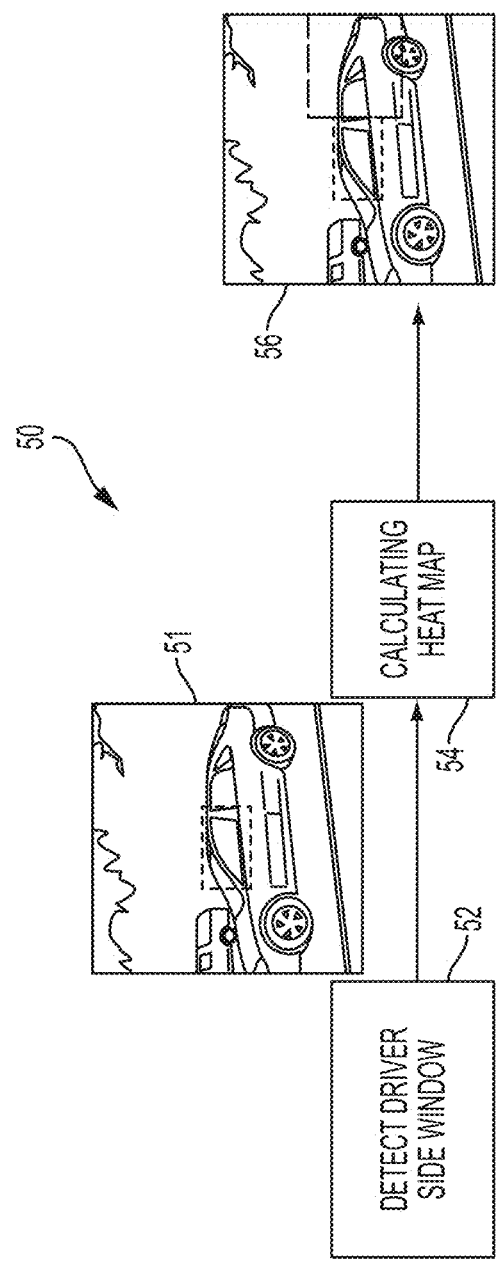
FIG. 5 illustrates a flow chart of operations depicting a method for detecting the likely location of a passenger side window by inferring the location of the detected driver side window, in accordance with an example embodiment.

In another example embodiment, the heat map can be calculated by first detecting driver side window and referring the likely passenger side window locations relative to the detected driver side window. This is illustrated in FIG. 5 where a driver side is first detected from a captured side view image and then the likely location of the passenger side window is inferred by the location of the detected driver side window. The motivation for first detecting the driver instead of passenger side window is that intra-class variation for driver side window is significantly lower compared to passenger (second row) side windows for different vehicle types. This observation has been validated with a set of experiments, which demonstrated that the accuracy of a driver side window detector (>99%) significantly outperforms that of a passenger side window detector (~90%) due to lower intra class variation.

FIG. 5 illustrates a flow chart of operations depicting a method 50 for detecting the likely location of a passenger side window by inferring the location of the detected driver side window, in accordance with an example embodiment. As shown at block 52, an operation can be implemented to detect a driver side window. Image 51, for example, depicts an image of a vehicle and the vehicle driver's side window. As indicated next at block 54, an operation can be implemented to calculate a heat map. The resulting image 56 is illustrated after the operation depicted at block 54.

Figure 6:
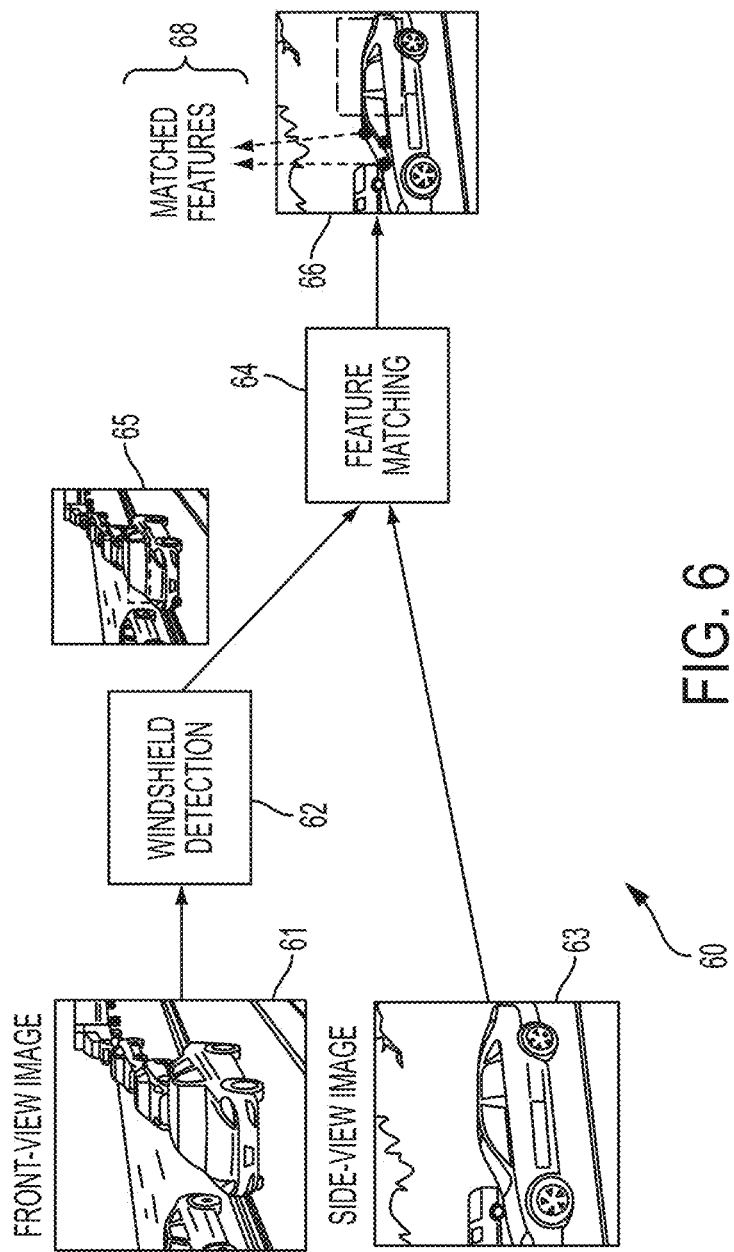
FIG. 6 illustrates a flow chart of operations depicting logical operational steps of a method for detecting the likely location of a passenger side window by inference using the location of matched features between front and side-view images, in accordance with an example embodiment.

In another example embodiment, the heat map can be calculated by first detecting a windshield from a front view image and performing a feature matching between the detected windshield and the side view image of the vehicle and referring the likely passenger side window locations based on the location of the matched features as illustrated in FIG. 6.

FIG. 6 illustrates a flow chart of operations depicting logical operational steps of a method 60 for detecting the likely location of a passenger side window by inference using the location of matched features between front- and side-view images, in accordance with an example embodiment. In the example embodiment shown in FIG. 6, the image acquisition system can include a triggering system that ensures that the spatial relationship between the front-view image 61 captured and the side-view image 63 captured are consistent. This can be achieved by using a single fixed trigger to trigger both the front-view camera and the side-view camera. Thus, as shown at block 62, a windshield detection operation with respect to image 61 can be implemented. The output image after being subject to the windshield detection operation is shown in FIG. 6 as image 65. A feature matching operation as indicated at block 64 can be further implemented with respect to image 63 and image 65 and the output image 66 is then generated with matched features 68. The output of this module is a heat map (or a probability map) generated utilizing one of the alternative methods described above.

After image acquisition and heat map calculation, a passenger side window detector (e.g., see block 36 in FIG. 3) can be run all across the side-view image in a sliding window fashion. Several methods can be employed for training an object detector, more specifically for windshield and side window detection from HOV/HOT images. For example, a detector can be trained by first collecting a set of positive and negative images. A set of features can then be extracted from both the positive and negative samples in the offline phase. The extracted features can then be utilized to train a classifier to distinguish the passenger side window images from other type of image patches. The extracted features may include one or more of, for example, Fisher Vector, HOG, Harris corners, or LBP, among others. The classifier trained utilizing the extracted features can be one of, for example, support vector machines (SVM), k-nearest neighbor (KNN), neural networks (NN), or convolutional neural networks (CNN), etc.

In an alternative approach, an appearance-based model can also be trained by defining a set of landmarks on the side window image. The model is then used to detect an occurrence of the side window in a given vehicle side-view image. The detection of side window can be performed utilizing an elastic deformation model for face detection. The output of this module includes the detection scores for each tested patch in the side-view image. These detection scores are then weighted (e.g., see block 38 of FIG. 3) based on the heat map calculated in the previous module.

Using the heat map (or the probability map), the detection scores can be weighted according to the likely locations of passenger side windows in a side-view image. Alternatively, the search of the vehicle image for the passenger side windows can be restricted to a narrow area defined by a probability contour within the probability map (e.g., see probability map 42 shown in FIG. 4). Thus the window-finding algorithm is less distracted by extraneous objects within the scene. Although the heat map can be used to reduce false positive detections, it alone cannot generate ROIs as precise as an object detector in terms of size and shape. Hence, running an object detector either across the entire image or only in an identified ROI (Region of Interest) is desirable for precise localization of passenger side windows.

After localizing the passenger side window, classifier is trained to identify passenger and no-passenger images. This requires offline and online phases. In the offline phase, operations can be implemented to acquire sample passenger/no-passenger images (i.e., positive and negative). These samples may be manually or automatically cropped from larger scene images. Also in the offline phase, image features can be extracted from the sample images to create global feature representations of the respective ROI's. Example image features include Fisher Vector, Histogram of Oriented Gradients (HOG), Harris corners, Local Binary patterns (LBP), Speeded up Robust Features (SURF), and Scale-invariant Feature Transform (SIFT) features. Finally, in the offline phase, an operation can be implemented to train a classifier, such as, for example, a Support Vector Machine (SVM), Decision Tree, or Neural Network utilizing the extracted image features to enable classification of an ROI as representing passenger/no-passenger.

In the online phase, a step or operation can be implemented to extract the same type of image features from the ROI as were used in the training to create a global feature representation of the ROI. Additionally, operations can be implemented in the online phase to apply the trained classifier from the offline phase, and utilize the global feature representation to make a decision regarding the violation/non-violation. Potential violators can be reviewed by a law-enforcement officer or back-office operator, and appropriate action may be taken (issue a ticket or warning, stop the vehicle, etc.).

Experiments were conducted utilizing real world data to test the performance of the disclosed approach. In one experimental embodiment, 250 side-view images were used of which half have a passenger and the other half have no passenger in the rear seat. In such experiments, two separate DPM models were trained: one for driver side window and the other for passenger side window. Two sets of experiments were conducted. In the first experiment, the performance of disclosed approach was tested where the driver side window was first detected and a ROI extracted based on the location of the detected driver side window. A passenger side window detector was then run only across the extracted ROI. In the second experiment, the baseline method was detected where the passenger side window detector was directly across the entire side-view image without calculating a probability map.

Figure 7:
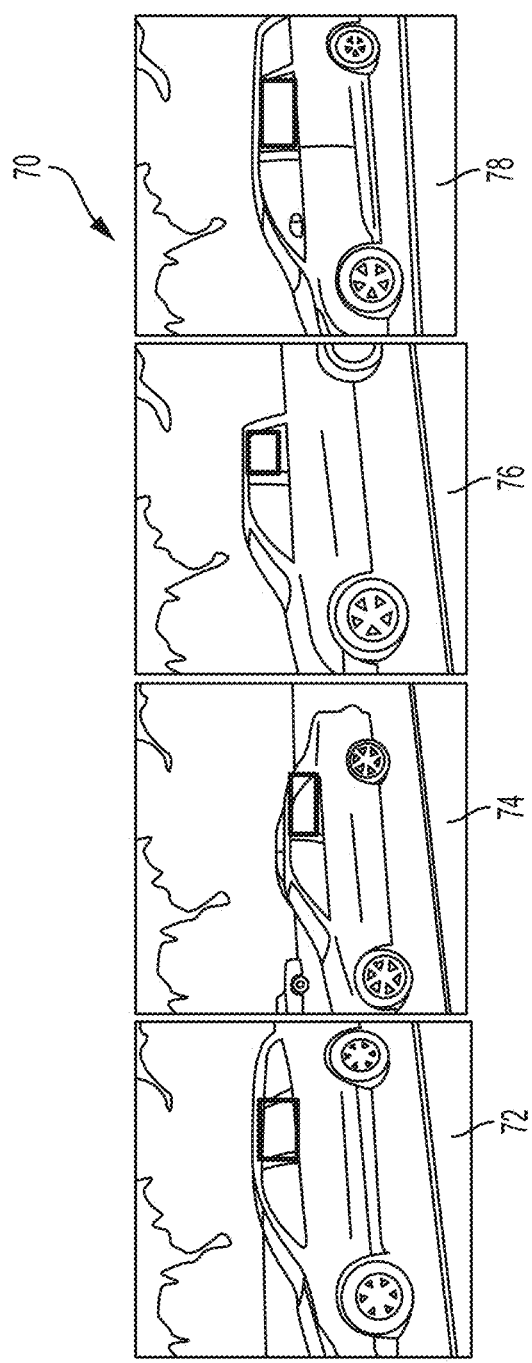
FIG. 7 illustrates a group of images depicting correctly detected passenger side windows, in accordance with an example embodiment.

FIG. 7 illustrates a group 70 of sample images 72, 74, 76, 78 depicting correctly detected passenger side windows, in accordance with an example embodiment. FIG. 7 demonstrates correctly detected passenger side windows using the disclosed approach, where the driver side window is first detected to extract a region of interest based on the driver side window. The passenger side window detector is then only run across the extracted ROI.

Figure 8:
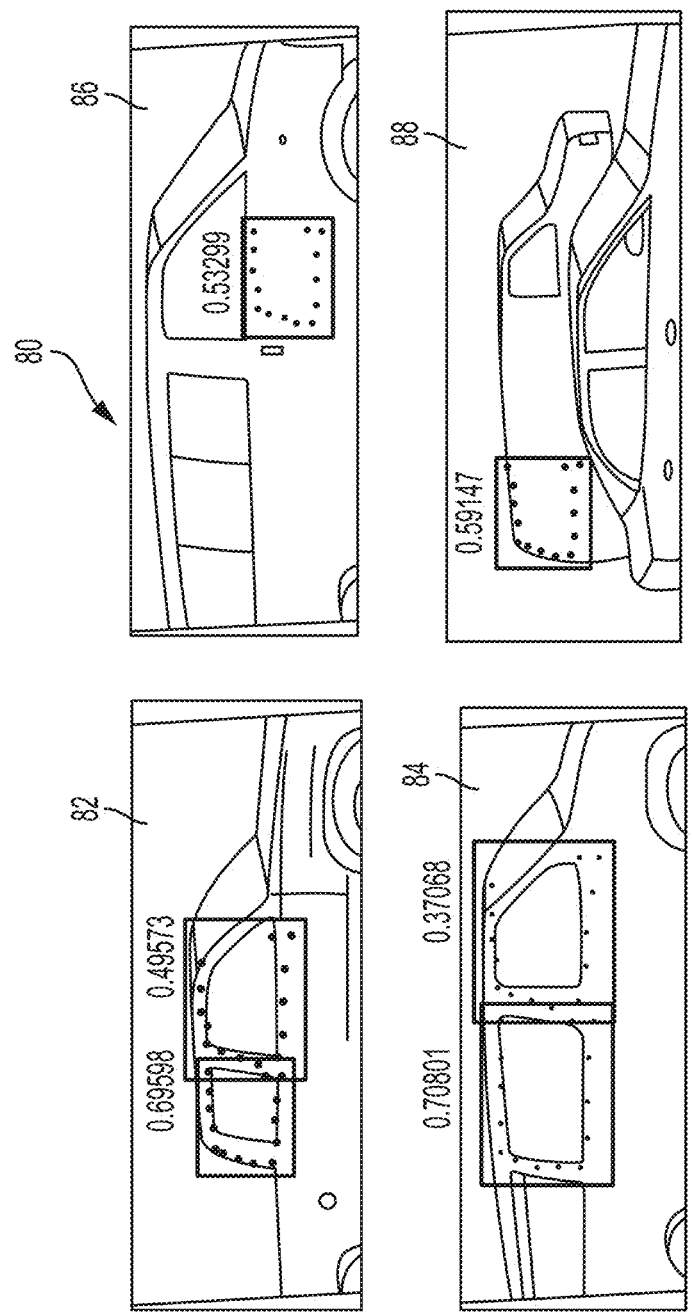
FIG. 8 illustrates a group of images that demonstrate some of the false and missed detections by a side window detector without using a heat map.

FIG. 8 illustrates a group 80 of images 82, 84, 86, 88 that demonstrate some of the false and missed detections by a side window detector without using a heat map. The detection accuracy for the method was 96% while the baseline had 90% accuracy. FIG. 4 thus shows some of the correctly detected side windows by the proposed approach, while FIG. 8 depicts some of the false and missed detections by the baseline.

Figure 9:
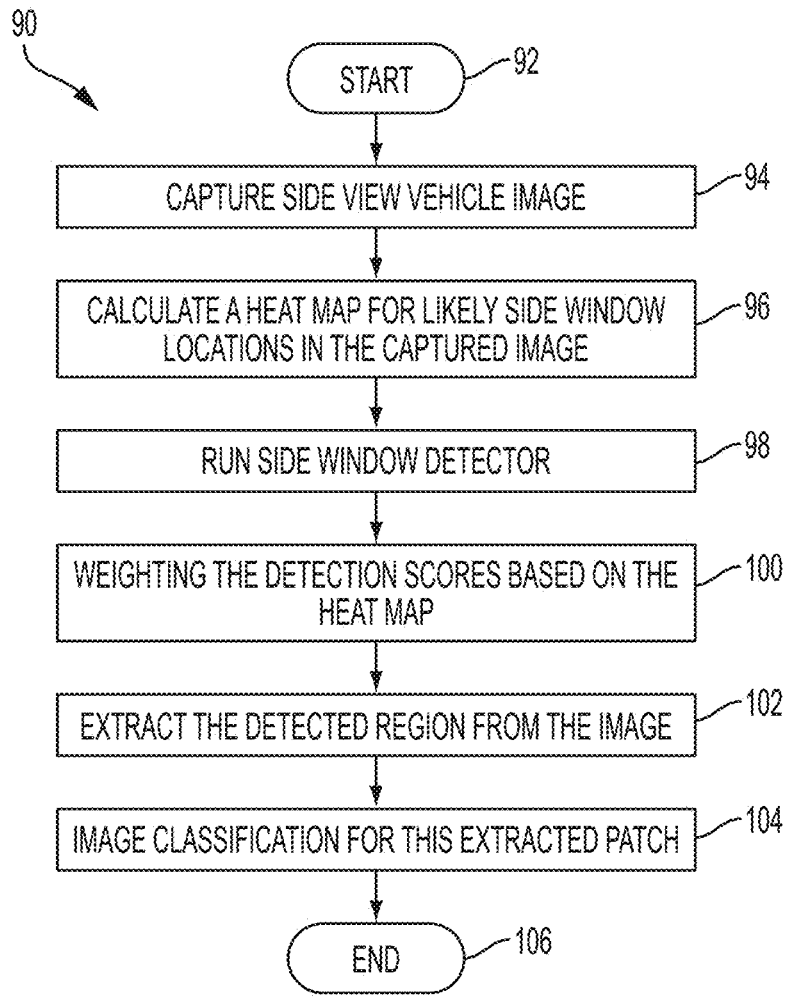
FIG. 9 illustrates a flow chart of operations depicting logical operational steps of a method for improved side window detection, which can be implemented in accordance with an example embodiment.

FIG. 9 illustrates a flow chart of operations depicting logical operational steps of a method 90 for improved side window detection, in accordance with an example embodiment. The method 90 can implement a two-stage process for side window detection. In the first stage, a spatial probability map (e.g., a "heat" map) can be calculated for likely side window locations. This heat map is then used to weigh the detection scores of the side window detector in the second step. As indicated previously, various approaches can be employed to calculate the heat map for the likely side window locations given a captured side window image.

Thus, the method 90 can be initiated, as indicated at block 92. Thereafter, as indicated at block 94, a step or operation can be implemented for capturing a side-view vehicle image. Then, as shown at block 96, a step or operation can be implemented to calculate a heat map for likely side window locations in the captured image. Following processing of the operation shown at block 96, a step or operation can be implemented as depicted at block 98 for running a side window detector using, for example, a deformable parts model. Then, as described at block 100, a step or operation can be implemented for weighting the detection scores based on the heat map.

Then, as indicated at block 102, a step or operation can be implemented for extracting the detected region from the image. Finally, as shown at block 104, a step or operation can be processed to perform an image classification for the extracted patch, where the classification indicates passenger/no-passenger. The process or method 90 can then end, as shown at block 106.

Figure 10:
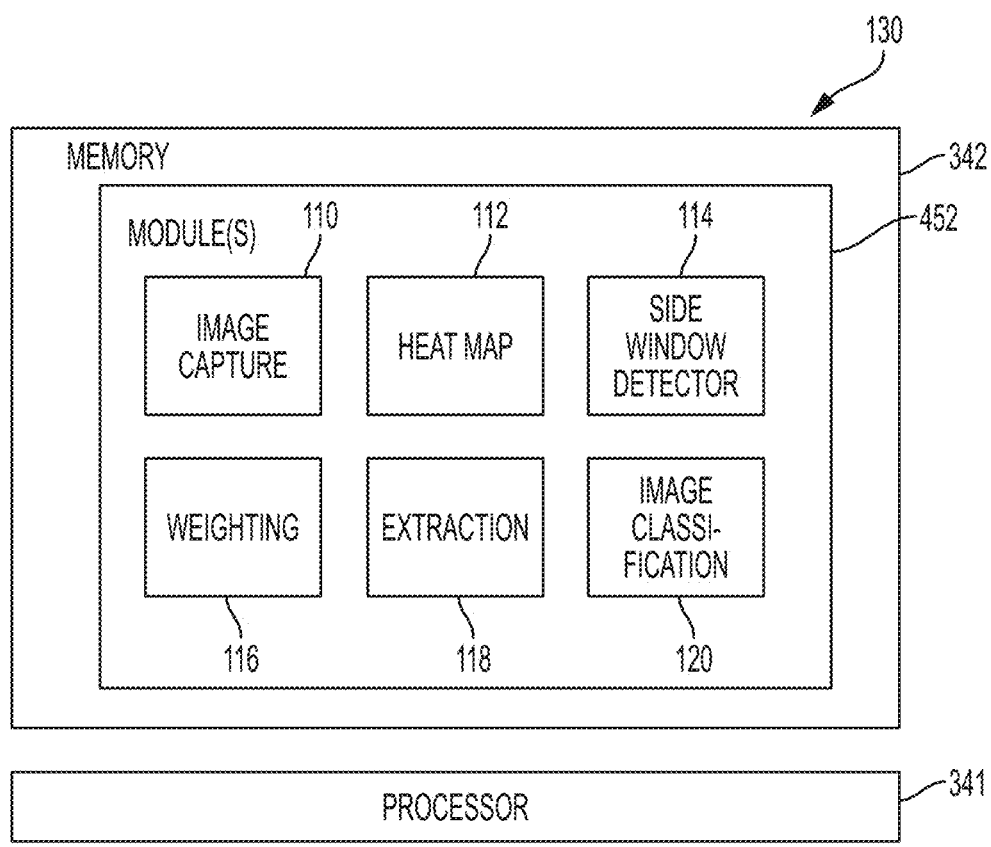
FIG. 10 illustrates a block diagram of a system for side window detection, which can be implemented in accordance with an example embodiment.

FIG. 10 illustrates a block diagram of a system 130 for side window detection, which can be implemented in accordance with an example embodiment. The system 130 includes a group of modules 452 including an image capture module 110, a heat map module 112, a side window detector module 114, a weighting module 116, an extraction module 118, and an image classification module 120. The modules can be stored in a memory 342 and processed via a processor 341. Note that the memory 342 and processor 341 are discussed in greater detail herein in the context the example embodiments illustrated in FIGS. 11-12. The modules 110, 112, 114, 116, 118, and 120 can implement the instructions herein with respect to FIG. 9. For example, the image capture module 110 includes instructions for capturing a side-view vehicle image, as discussed previously herein. The heat map module 112 includes instructions for calculating a heat map for likely side window locations in the captured image, as also discussed previously herein. The side window detector module 114 (also referred to simply as the "side window detector") implements instructions for running a side window detector using, for example, a deformable parts model, as discussed previously herein. The weighting module 116 provides instructions for weighting the detection scores based on the heat map and extracting the detected region from the image, as discussed previously herein. The extraction module 118 includes instructions for performing an image classification for the extracted patch, wherein the classification indicates passenger/no-passenger.

The system 130 thus implements the previously discussed two-stage approach for side window detection. As indicated previously, in the first stage, the spatial probability map ("heat" map) is calculated (via the heat map module 112) for likely side window locations and the resulting heat map is used to weight (via the weighting module 116) the detection scores of the side window detector or module 114 in the second step. As previously noted, several alternative novel approaches can be utilized to calculate the heat map for the likely side window locations given a captured side window image.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the users computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 11:
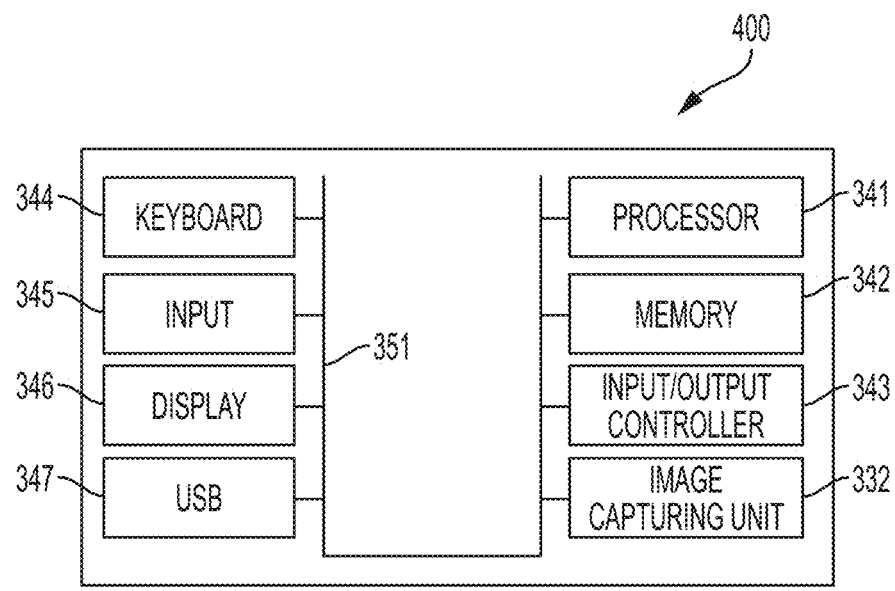
FIG. 11 illustrates a schematic view of a computer system, in accordance with an example embodiment.
Figure 12:
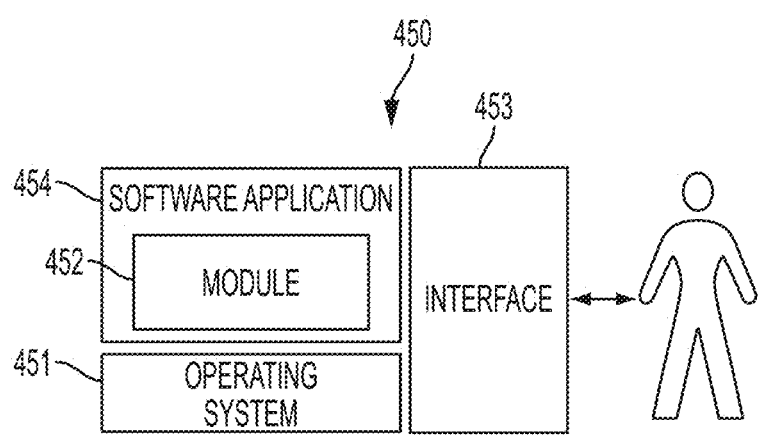
FIG. 12 illustrates a schematic view of a software system including a module, an operating system, and a user interface, in accordance with an example embodiment.

FIGS. 11-12 are provided as exemplary diagrams of data-processing environments in which embodiments may be implemented. It should be appreciated that FIGS. 11-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments. Note that in FIGS. 10, 11, and 12, identical or similar parts or elements are generally indicated by identical reference numerals.

As illustrated in FIG. 11, some example embodiments may be implemented in the context of a data-processing system 400 that can include one or more processors such as the previously discussed processor 341, the previously discussed memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, an image-capturing unit 332 (e.g., a digital video camera, an ALPR camera, etc.). Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

FIG. 12 illustrates a computer software system 450 for directing the operation of the data-processing system 400 shown in FIG. 11. The software application 454 can be stored for example, in memory 342 of the data-processing system 400 shown in FIG. 11. The computer software system 450 generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453 (e.g., a GUI or Graphical User Interface); these inputs may then be acted upon by the data-processing system 400 in accordance with instructions from operating system 451 and/or software application 454. The interface 453, in some example embodiments, can serve to display results, whereupon a user may supply additional inputs or terminate a session.

The software application 454 can include one or more modules such as, for example, a module 452 (or a module composed of a group of modules such as shown in FIG. 10), which can, for example, implement instructions or operations such as those described herein. Examples of instructions that can be implemented by module 452 include steps or operations such as those shown and described herein with respect to blocks 92-106 of FIG. 9 and described elsewhere herein. Note that module 452 may be composed of sub-modules, such as, for example, the modules 110, 112, 114, 116, 118, and 120 described herein with respect to FIG. 10.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" such as module 452 shown in FIG. 12 constitutes a software application. However, a module may also be composed of, for example, electronic and/or computer hardware or such hardware in combination with software. In some cases, a "module" can also constitute a database and/or electronic hardware and software that interact with such a database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIG. 1, for example, and discussed elsewhere herein can be implemented in the context of such a module or modules, sub-modules, and so on.

FIGS. 11-12 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 13:
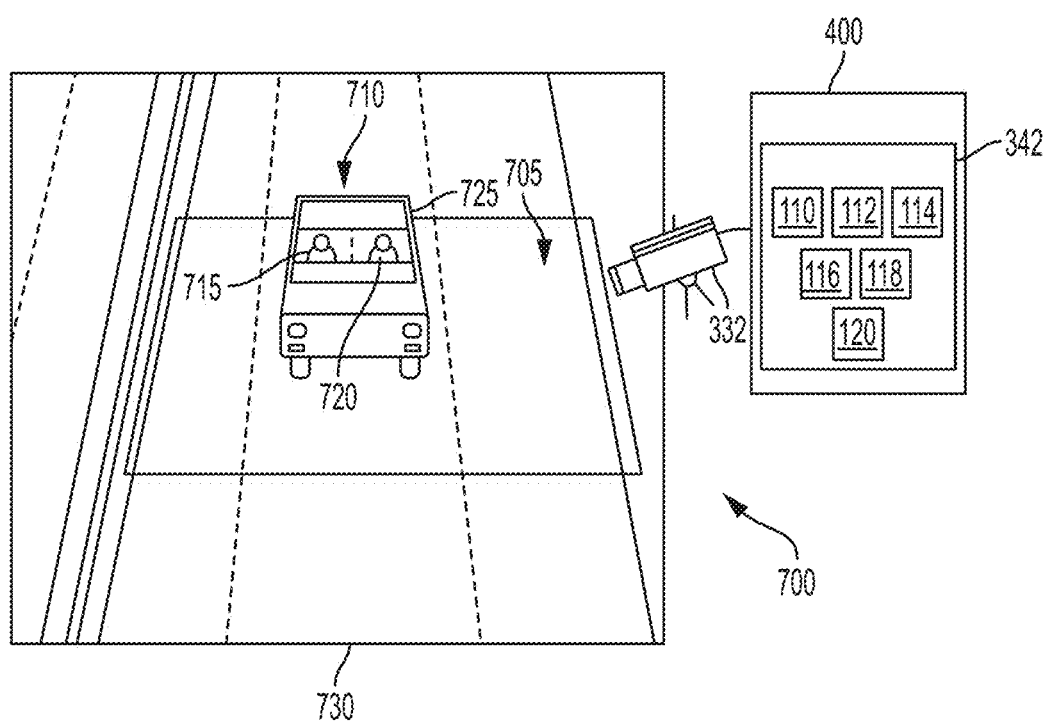
FIG. 13 illustrates a system for determining vehicle occupancy, in accordance with an example embodiment.

FIG. 13 illustrates a HOV/HOT image acquisition system 700 for detecting managed lane violations in HOV/HOT lanes based on side window detection, in accordance with an example embodiment. In one embodiment, the system may be deployed in an environment 730 such as along an expressway, as shown in FIG. 13. The environment 730 may also be any other environment where video surveillance is performed and preferably in an environment characterized by motion of vehicle in a HOV or HOT lane. The example of an express way shown in FIG. 13 is provided solely as an example and not intended to limit the scope of the application.

Within environment 730, a vehicle 710 may be present on a roadway, a HOV lane, a HOT lane, in an intersection, in a parking facility, or any other such environment. The vehicle 710 may contain one or more passengers such as a passenger 715 and a vehicle driver 720. A windshield region 725 of the vehicle 710 is also shown in the example depicted in FIG. 13. As the vehicle 710 enters an area or region of interest 705, video acquisition module 332, herein shown as a video camera, collects video or image data of the area of interest 705. It should be appreciated that the video or image data of the area of interest 705 may be continuously collected, or alternatively, video or image acquisition may be triggered when a vehicle enters the area of interest 705. Furthermore, the image capturing unit 332 (e.g., a video camera, etc.) may save video data in a database (not shown in FIG. 11) and associated data structure such as a database stored in, for example, memory 342 of computer system 400.

The image-capturing unit 332 may be operably connected with the computer system 400 and/or a computer network (as discussed previously). In the example embodiment of FIG. 13, the computer system 400 is shown with a number of associated modules used to implement the processing steps and/or modules discussed previously, such as, for example, modules 110, 112, 114, 116, 118, 120.

As the vehicle 710 enters the area of interest 705, the video camera or image capturing unit 332 can collect images and/or video data of the vehicle 710 and transmit that data to the computer system 400 and to the modules 110 and so on. For example, the image-capturing module 110 can implement instructions for managing the capturing, receipt, and transfer of video and image data from the image-capturing unit 332.

Based on the foregoing, it can be appreciated that a number of preferred and alternative example embodiments are disclosed herein. For example, in one embodiment a method for detecting a side window of a vehicle can be implemented. Such a method can includes steps or operations for calculating a spatial probability map that includes data indicative of likely side window locations of a vehicle in an image; running a side window detector with respect to the image of the vehicle to determine a plurality of detection scores; weighting the plurality of detection scores based on the spatial probability map; extracting a detected region from the image as extracted patch of the image; and performing an image classification with respect to the extracted patch to provide a classification that indicates whether or not a passenger is in a rear seat of the vehicle or no-passenger is in the rear seat of the vehicle.

In some example embodiments, a step or operation can be implemented for initially capturing the image of the vehicle utilizing an HOV/HOT image acquisition system. In yet another example embodiment, the step or operation of calculating the spatial probability map can further include a step or operation for calculating the spatial probability map by labeling a passenger side window on a set of training images. In still another embodiment, the step or operation of calculating the spatial probability map can further include steps or operations for detecting the driver side window of the vehicle in the image; and referring passenger side window locations on the vehicle in the image to a detected driver side window of the vehicle in the image.

In another embodiment, the step or operation of calculating the spatial probability map can further involve steps or operations for detecting a windshield of the vehicle from a front view image of the vehicle derived from the image; performing a feature matching operation between the detected windshield and the side view image of the vehicle; and referring likely passenger side window locations of the vehicle in the image based on a location of matched features determined as a result of the feature matching operation.

In another embodiment, a step or operation can be implemented for training a classifier in an offline phase to perform the image classification. In some embodiments, the step or operation of training the classifier can further include a step or operation for training the classifier utilizing the extracted patch to distinguish passenger side window images from types of image patches. In yet another embodiment, step or operation of running the window detector can further include a step or operation of running the side window detector utilizing a DPM (Deformable Parts Model).

In another embodiment, a system for detecting a side window of a vehicle can be implemented. Such a system can include, for example, at least one processor and a computer-usable medium embodying computer program code, the computer-usable medium capable of communicating with the at least one processor. The computer program code can include instructions executable by the at least one processor and configured for: calculating a spatial probability map that includes data indicative of likely side window locations of a vehicle in an image; running a side window detector with respect to the image of the vehicle to determine a plurality of detection scores; weighting the plurality of detection scores based on the spatial probability map; extracting a detected region from the image as extracted patch of the image; and performing an image classification with respect to the extracted patch to provide a classification that indicates whether or not a passenger is in a rear seat of the vehicle or no-passenger is in the rear seat of the vehicle.

In yet another embodiment, a processor-readable medium storing computer code representing instructions to cause a process for detecting a side window of a vehicle can be implemented. Such computer code can include code to, for example: calculate a spatial probability map that includes data indicative of likely side window locations of a vehicle in an image; run a side window detector with respect to the image of the vehicle to determine a plurality of detection scores; weight the plurality of detection scores based on the spatial probability map; extract a detected region from the image as extracted patch of the image; and perform an image classification with respect to the extracted patch to provide a classification that indicates whether or not a passenger is in a rear seat of the vehicle or no-passenger is in the rear seat of the vehicle.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for detecting a side window of a vehicle, said method comprising:
   calculating a spatial probability map that includes data indicative of likely side window locations of a vehicle in an image;
   running a side window detector with respect to said image of said vehicle to determine a plurality of detection scores;
   weighting said plurality of detection scores based on said spatial probability map;
   extracting a detected region from said image as extracted patch of said image; and
   performing an image classification with respect to said extracted patch to provide a classification that indicates whether or not a passenger is in a rear seat of said vehicle or no-passenger is in said rear seat of said vehicle.

2. The method of claim 1 further comprising initially capturing said image of said vehicle utilizing an HO/HOT image acquisition system.

3. The method of claim 1 wherein said calculating said spatial probability map, further comprises:
   calculating said spatial probability map by labeling a passenger side window on a set of training images.

4. The method of claim 1 wherein said calculating said spatial probability map, further comprises:
   detecting a driver side window of said vehicle in said image; and
   referring passenger side window locations on said vehicle in said image to a detected driver side window of said vehicle in said image.

5. The method of claim 1 wherein said calculating said spatial probability map, further comprises:
   detecting a windshield of said vehicle from a front view image of said vehicle derived from said image;
   performing a feature matching operation between said detected windshield and said side view image of said vehicle; and
   referring likely passenger side window locations of said vehicle in said image based on a location of matched features determined as a result of said feature matching operation.

6. The method of claim 1 further comprising training a classifier in an offline phase to perform said image classification.

7. The method of claim 6 wherein said training said classifier further comprises:
   training said classifier utilizing said extracted patch to distinguish passenger side window images from types of image patches.

8. The method of claim 6 wherein said running said window detector, further comprises:

running said side window detector utilizing a DPM (Deformable Parts Model).

9. A system for detecting a side window of a vehicle, said system comprising:
at least one processor; and
a computer-usable medium embodying computer program code, said computer-usable medium capable of communicating with said at least one processor, said computer program code comprising instructions executable by said at least one processor and configured for:
calculating a spatial probability map that includes data indicative of likely side window locations of a vehicle in an image;
running a side window detector with respect to said image of said vehicle to determine a plurality of detection scores;
weighting said plurality of detection scores based on said spatial probability map;
extracting a detected region from said image as extracted patch of said image; and
performing an image classification with respect to said extracted patch to provide a classification that indicates whether or not a passenger is in a rear seat of said vehicle or no-passenger is in said rear seat of said vehicle.

10. The system of claim 9 wherein said instructions are further configured for initially capturing said image of said vehicle utilizing an HOV/HOT image acquisition system.

11. The system of claim 9 wherein said instructions for calculating said spatial probability map, further comprises instructions for:
calculating said spatial probability map by labeling a passenger side window on a set of training images.

12. The system of claim 9 wherein said instructions for calculating said spatial probability map, further comprises instructions for:
detecting a driver side window of said vehicle in said image; and
referring passenger side window locations on said vehicle in said image to a detected driver side window of said vehicle in said image.

13. The system of claim 9 wherein said instructions for calculating said spatial probability map, further comprises instructions for:
detecting a windshield of said vehicle from a front view image of said vehicle derived from said image;
performing a feature matching operation between said detected windshield and said side view image of said vehicle; and
referring likely passenger side window locations of said vehicle in said image based on a location of matched features determined as a result of said feature matching operation.

14. The system of claim 9 wherein said instructions are further configured for training a classifier in an offline phase to perform said image classification.

15. The system of claim 14 wherein instructions for said training said classifier further comprises instructions configured for:
training said classifier utilizing said extracted patch to distinguish passenger side window images from types of image patches.

16. The system of claim 15 wherein said instructions for running said window detector, further comprises instructions configured for:
running said side window detector utilizing a DPM (Deformable Parts Model).

17. A non-transitory processor-readable medium storing computer code representing instructions to cause a process for detecting a side window of a vehicle, said computer code comprising code to:
calculate a spatial probability map that includes data indicative of likely side window locations of a vehicle in an image;
run a side window detector with respect to said image of said vehicle to determine a plurality of detection scores;
weight said plurality of detection scores based on said spatial probability map;
extract a detected region from said image as extracted patch of said image; and
perform an image classification with respect to said extracted patch to provide a classification that indicates whether or not a passenger is in a rear seat of said vehicle or no-passenger is in said rear seat of said vehicle.

18. The processor-readable medium of claim 17 wherein said code is further configured for initially capturing said image of said vehicle utilizing an HOV/HOT image acquisition system.

19. The processor-readable medium of claim 17 wherein said code is further configured for training a classifier in an offline phase to perform said image classification.

20. The processor-readable medium of claim 19 wherein:
said code for training said classifier in said offline phase to perform said image classification further comprises code for training said classifier utilizing said extracted patch to distinguish passenger side window images from types of image patches; and
said code for running said window detector, further comprises code for running said side window detector utilizing a DPM (Deformable Parts Model).

* * * * *